US011668616B2

(12) United States Patent
Gruebele et al.

(10) Patent No.: US 11,668,616 B2
(45) Date of Patent: Jun. 6, 2023

(54) STRETCHABLE TACTILE SLEEVE FOR ROBOTIC EXTREMITIES

(71) Applicant: The Board of Trustees of the Leland Stanford Junior University, Stanford, CA (US)

(72) Inventors: Alexander M. Gruebele, Menlo Park, CA (US); Michael A. Lin, Sunnyvale, CA (US); Mark R. Cutkosky, Palo Alto, CA (US); Daniel C. Brouwer, Irvine, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/701,563

(22) Filed: Mar. 22, 2022

(65) Prior Publication Data

US 2022/0316974 A1    Oct. 6, 2022

Related U.S. Application Data

(60) Provisional application No. 63/168,091, filed on Mar. 30, 2021.

(51) Int. Cl.
*G01L 19/00* (2006.01)
*G01L 5/00* (2006.01)
*B25J 13/08* (2006.01)

(52) U.S. Cl.
CPC ........ *G01L 19/0023* (2013.01); *G01L 5/0061* (2013.01); *B25J 13/084* (2013.01)

(58) Field of Classification Search
None
See application file for complete search history.

(56) References Cited

U.S. PATENT DOCUMENTS

| | | | |
|---|---|---|---|
| 6,523,423 B1* | 2/2003 | Namerikawa | G01L 5/167 73/862.391 |
| 9,080,918 B2* | 7/2015 | Fishel | G01L 5/228 |
| 10,441,185 B2* | 10/2019 | Rogers | A61B 5/4875 |
| 2012/0118066 A1* | 5/2012 | Majidi | G01L 1/205 73/719 |
| 2018/0143091 A1* | 5/2018 | Wood | G01L 1/2287 |
| 2020/0025699 A1* | 1/2020 | Yeo | A61B 5/02108 |

* cited by examiner

*Primary Examiner* — Lisa M Caputo
*Assistant Examiner* — Nigel H Plumb
(74) *Attorney, Agent, or Firm* — Lumen Patent Firm

(57) ABSTRACT

A stretchable sensor skin is provided, which is a soft tactile sensor sleeve that can cover large areas of a robot, and is both low-cost and robust. It is made of elastomer molded pouches (referred to as sensor taxels) that when contacted transmit pneumatic pressure to off-board barometric sensors, via stretchable channels. The entirely soft makeup of the sleeve makes it highly conformable to 3D curved geometries of a robot. The stretchable channels mean that it can cover joints without wiring getting caught. The stretchable rubber channels are also inherently more robust than stretchable conductor approaches, and the skin lacks fragile soft-rigid interfaces that has plagued many other sensor skins. The fact that there are no conductive components also makes the skin easy to sanitize and waterproof.

5 Claims, 8 Drawing Sheets

STRETCHABLE TACTILE SLEEVE FOR ROBOTIC EXTREMITIES

CROSS-REFERENCE TO RELATED APPLICATIONS

This application claims priority from U.S. Provisional Patent Application 63/168,091 filed Mar. 30, 2021, which is incorporated herein by reference.

FIELD OF THE INVENTION

This invention relates to tactile sensing devices and methods.

BACKGROUND OF THE INVENTION

Robots are increasingly leaving work cells and entering unstructured environments such as the home. To successfully navigate these challenging environments and perform tasks safely, they need appropriate sensing. While vision is a very effective method of perceiving the state of an environment and providing feedback during manipulation, performing tasks in cluttered spaces often leaves vision occluded. Tactile and/or proximity sensing are invaluable in such scenarios for allowing the robot to complete tasks while detecting contacts and avoiding undesired collisions. Fingertip tactile sensors are reported for manipulation. However, for working in cluttered environments, the backs and sides of hands, as well as the wrist and forearm should also be covered with sensors.

Humans rely on tactile sensors from these additional locations in combination with proprioception in many tasks for which vision is limited or obstructed: reaching into a drawer, groping for items, pushing objects out of the way to reveal a hidden object, etc. Our sensitivity is such that we can usually displace objects without knocking them over. We also use whole-arm tactile sensing when carrying bulky objects, for example tucking a box under our arm.

In robotics, the topic of whole-arm tactile sensing has received less attention than fingertip sensing, in part due to the challenges of creating and integrating a durable, stretchable, flexible sensory skin. Two common approaches to scalable skins are: (1) rigid components are located at the sensing site to capture a signal and convert it to digital information for remote transmission, or (2) the signal is transmitted through shielded conductors to off-board processing components. In either case, without stretchable signal transmission, wires must either have slack to accommodate joint motions or wiring must be carefully integrated within the joint. Several approaches have been explored and the most relevant among these are reviewed in the next paragraphs.

Common challenges face sensor skin designs, especially when leaving the bench top for real-world applications. The first is physical robustness: many tactile sensors require micro-electromechanical systems (MEMS) chips to be located at the sensor site to perform analog-to-digital conversion without noise acting on lengthy wire traces. Examples include sensor arrays with capacitive, magnetic, piezoresistive or optical transducers.

The chips, and frequently the transducers that they read, are not flexible or stretchable. Therefore, stretching and flexing are provided by the intervening circuitry. A multilayer flexible PCB is bendable, but requires to be cut into patterns to permit stretch or to conform to doubly-curved surfaces. For regions that span robot joints, one often needs loops or folds to provide slack, which run the risk of catching on objects. In addition, the bonding of rigid devices onto circuits and establishment of electrical connections on regions that undergo extensive flexing presents a challenge for durability and reliability. To overcome the challenges listed above, others have developed stretchable sensors using liquid metal in channels, but these are sensitive to stretch.

Barometric pressure chips have been used for tactile sensing. When potted in an elastomeric skin, they provide an accurate, scalable pressure sensing approach with robust digital communication. However, the challenges mentioned above concerning flexible PCBs, connections and wiring remain. In a different implementation, an incompressible fluid is used to transmit vibrations to a pressure sensing chip at the core of a fingertip. These approaches require that the barometric sensor is located at the sensing site, or that fluid is routed over joints by lengths of tubing. Acoustic waves measured remotely by a microphone have also been used for tactile sensing in a soft finger in which case the rigid microphone must be contained in the soft sensing chamber. Other approaches include tomography of conductive liquid and colored-liquid based vision approaches, but they are limited to non-stretchable form factors by their channels. Another approach is to embed wireless devices in a stretchable skin. Challenges include power consumption and sensitivity to nearby sources of electromagnetic noise.

Aside from measuring contact force or pressure, another sensing approach for robots is proximity sensing. A difficulty with proximity sensing is that many of the modalities are affected by the environment and the object being detected. For example, capacitive and magnetic sensors are affected by the material properties of an object; optical sensors are affected by the specularity of its surface.

The present invention addresses these concerns and shortcoming and provides a new technical solution.

SUMMARY OF THE INVENTION

The present invention provides a new approach at a sensor skin that improves at least some of these weaknesses, concerns and shortcomings in the art. In one embodiment, a sensor sleeve is a soft tactile sensor sleeve that can cover large areas of a robot, and is both low-cost and robust. It is made of elastomer molded pouches (referred to as sensor taxels) that when contacted transmit pneumatic pressure to off-board barometric sensors, via stretchable channels. The entirely soft makeup of the sleeve makes it highly conformable to 3D curved geometries of a robot. The stretchable channels mean that it can cover joints without wiring getting caught. The stretchable rubber channels are also inherently more robust than stretchable conductor approaches, and the skin lacks fragile soft-rigid interfaces that has plagued many other sensor skins. The fact that there are no conductive components also makes the skin easy to sanitize and waterproof.

While stretching a channel would normally result in an overall volume change in the sensor, thus creating an errant signal (noise), in the embodiments of this invention the inventors have designed sensor pouches to have thin membranes relative to the area and material stiffness of the pouch such that ambient pressure can re-equilibrate the internal pressure of the sensor as the channel stretches. Another consideration regarding the ability to suppress noise from stretching is the ratio of initial taxel volume to channel volume. Appropriate ranges of thickness, t, area, A, Young's modulus, E, taxel volume, $V_{tax}$, and channel volume, $V_{chan}$, are as follows: $t \leq 10$ mm, $\pi t^2 \leq A \leq 1$ m$^2$, 70 kPa$\leq E \leq 10$ MPa, $V_{chan} \leq V_{tax}$. This is the key innovation the inventors designed that enables a skin like this to be possible.

In choosing values within these ranges, the objectives and key concept as described must still be obtained. To maintain the ability to reject noise from stretch, one must minimize the membrane stiffness, K, within the bounds of desired taxel size and durability as well as manufacturing constraints. This membrane stiffness scales according to equation 2 (infra) and the corresponding errors in pressure due to 100% channel stretch are shown for several potential embodiments in FIG. 3. One specific embodiment exhibits an error of 0.0146 kPa from 100% channel stretch with $t=1.5$ mm, $A=707$ mm$^2$, $E=151$ kPa, (therefore $K=0.63$ N/m), and $V_{tax}=17.1 V_{chan}$.

In another embodiment, the invention is described with a key innovation where ambient pressure equilibration for a stretchable transmission leading up to a sensor. This allows one to have a fluid sensor system, where the sensor taxels (where contact is expected and measured) can be distributed far away (e.g. 1 m or more) from the rigid barometric chips (which actually measure pressure). The reason for that objective is that one can have a fully soft skin instead of putting rigid chips all over a skin with the necessary conductive wiring to process and power them.

If the goal is to separate the fragile and rigid barometric chips from the sensing contact sites (subject to forces), one needs to somehow transmit that pressure data between the sensor taxel and those rigid barometric chips. People in the past using pressure sensors have used stiff plastic tubing, which then dangles off the skin and needs to be fairly slack if one wants to route it over or through a moving robot joint. Embodiments in this invention fixes this aspect, allowing one to incorporate the transmission medium into the skin along with the sensor taxels, so it's one big rubber glove/sleeve that can be slipped flush over the robot.

Transmission medium: This is accomplished with tiny (pneumatic in the case of the exemplary embodiment in the detailed description, but it could also be hydraulic) channels. The channel connects the taxel to the barometric chip. Thus, as one would expect, pressing on the taxel increases the pressure in that closed volume of taxel to channel to barometer, which one could then measure at the barometer. Now what about stretching the channel; one would want to be able to stretch these channels tens to hundreds of percent in length over joints so they can conform to a robot's motion. If one stretches this channel, what one should observe is that the pressure measured in the system drops (this is bad as it is an errant signal that has nothing to do with contact). This happens because the total volume in the system as the channel stretches, increases (longer channel, much less decrease in cross-sectional area). Therefore, the pressure decreases because there is a fixed amount of gas in the system in a larger volume. This is shown in the top two parts of FIG. 2.

The bottom portion of FIG. 2 shows the pressure equilibration effect that the inventors believe is one of the key points of the invention. The inventors have managed to prevent for the most part, that errant dip in pressure that occurs as the channel stretches, and therefore don't have much signal noise from the stretch of the skin. The way that this works is that if you have a relatively thin (see details supra) membrane on the taxel, when the pressure inside dips slightly below the atmospheric pressure it was at (due to channel volume increase), outside air pressure compresses that membrane a little bit, until the pressures have equalized. Thus, one maintains close to neutral pressure in the system, and don't measure a signal change as it stretches. This does not happen if outside force applies a pressure that compresses the system (increasing internal pressure above ambient)—so one does capture force signals, even very small ones, as desired.

FIG. 4 sort of illustrates the effect. In two trials here the channel is stretched, don't see much dip in measured pressure (one uses a mass too to show ground truth). The one that has a negative slope here is one the inventors coated the membrane with epoxy to make it highly rigid. It could not be pushed down and equilibrated by atmospheric pressure, so one sees a dip in measured pressure signal as the transmission channel is stretched.

The amount that the membrane can dip and compensate for the negative pressure during stretching, depends on the stiffness of the membrane, which one can model as a plate. Thinner leads to less stiff which leads to better equilibration. Softer material (soft elastomer versus hard plastic or even a metal diaphragm) leads to less stiff which leads to better equilibration. And larger membrane area leads to less stiff plus a larger area for outer pressure to be exerted on which leads to better equilibration.

The amount of necessary equilibration depends on use case.
  if you're dealing with 10 lb contacts mostly, a 10% error would be acceptable.
  if you're dealing with gram contacts, maybe one would want <1% error.

For the purposes of proof of concept, the inventors modeled this for a specific very soft elastomer, and at sizes that would fit on a robot hand/finger (FIG. 3, FIG. 1B).

Because of this equilibration effect, the inventors were able to make a skin as a whole too (entirely soft rubber and fabric). This skin could be applied at many scales, from finger size to large robots or more. On the smaller scale, the equilibration will be limited in its capability to compensate, due to small volumes, and small membrane areas.

In one embodiment, the invention is a stretchable tactile sensor that has a plurality of elastomeric pouches. Each of the plurality of elastomeric pouches is connected to a corresponding elastomeric channel. The elastomeric channel is connected to a corresponding off-board sensor. Each of the plurality of elastomeric pouches, when contacted, transmits a pressure via the corresponding elastomeric channel to the corresponding off-board sensor. Each of the plurality of elastomeric pouches is sensitive to an applied pressure pressure (depending on sensitivity of off-board pressure sensor used) ranging from 0.01 kPa over an ambient pressure up to 5 MPa (also depends on upper bound of off-board pressure sensor used).

In one embodiment, each of the plurality of elastomeric pouches:
  has a thickness t, where $t \leq 10$ mm,
  has an area A defined as $\pi t^2 \leq A \leq 1$ m$^2$,
  has a Young's modulus E defined as 70 kPa$\leq E \leq 10$ MPa, and
  has a pouch volume, $V_{pouch}$, defined with respect to a channel volume, $V_{channel}$, of their corresponding elastomeric channel defined as $V_{channel} \leq V_{pouch}$.

In one embodiment, the off-board sensors are located 1 meter or more from the plurality of elastomeric pouches. Ten meters if feasible for any scale of robot arm or mechanized joint. However, it could also be at least a couple of centimeters away allowing the skin to bend over a wrist flexion, while the offboard sensors are embedded in the nearby arm. Could be meters away if a giant excavator joint or an ISS multi-meter robot arm.

In one embodiment, the stretchable tactile sensor is designed to cover or encompass a space whereby the space allows motion that would stretch the stretchable tactile sensor.

In one embodiment, the plurality of elastomeric pouches with their corresponding elastomeric channels and specific for their force sensing applications do not have any conductive or electronic components.

BRIEF DESCRIPTION OF THE DRAWINGS

(FIG. 5A) top plot shows a 5 g (49 mN) reference mass and the small errors the proximal and distal grounded taxels see during various motions. The change in signal due to stretching of the skin and channels is low, so sensing is reliable while the robot is moving. The bottom plot in FIG. 5A shows the larger errors seen by a floating taxel, measured at the same time as the top plot. Errors here are larger as the floating taxel does at points come into contact (from beneath) with the underlying wrist surface, producing a signal. (FIG. 5B) the hand and skin in neutral position, with rivets anchoring the skin for precise measurements. (FIG. 5C) the hand at 60 of stretching flexion. For grey-scale to color interpretation, the reader is referred to the priority document.

DETAILED DESCRIPTION

The design of the embodiments of this invention presented herein, there is a fundamental difference with prior approaches in that the sensor skin can be fully soft and stretchable, with rigid chips (in this case barometric) located completely off-board. This is made possible by stretchable channels and a pressure equilibration method that compensates dynamically for channel stretching and flexing. The result is a skin that is durable with respect to stretching and impacts, and can be used with both traditional and soft robots.

With this approach the channels do not have to be electrical. Pneumatic pressure for both transduction and signal transmission is inherently well suited to soft robots as well as conventional robot arms, especially when there are joint gaps or regions which do not provide a firm substrate. An advantage to using pneumatic taxels with low working pressures (on the order of 0.1 Bar above ambient) is that they are less dependent on having a firm substrate than most capacitive and piezoresistive pressure-sensing elements, which require higher local stresses within the sensing elements. Consequently, a soft pneumatic skin can be placed over a soft robot or open joint gaps and still produce measurable signals for light contacts. In addition, it is straightforward to make the sensor work under water, again with small variations around hydrostatic ambient pressure.

In the following we present a new stretchable sensory skin design, with a prototype in the form of a sleeve that can be pulled over a 2 degree-of-freedom (DoF) robot wrist. The sleeve is covered on all sides with small pneumatic membranes that produce pressure signals on contact. The taxels are locally stabilized with internal fabric to maintain a stable signal while the sleeve is stretched by the robot's motion. Pressure is conducted through stretchable channels to barometer chips, which can be located 1 m or more remote from the individual sensor units, or taxels. This feature makes it comparatively easy to scale the design to large areas and over joints. Stretching the channels up to 100% produces little effect on the taxel signals due to equilibration with ambient pressure. With no electronics at the sensing sites, the skin is durable and waterproof, making it also washable and potentially sterilizable in healthcare settings. The cost of materials is low.

We further present an elastic/pneumatic model of the taxels which provides insights regarding how to scale taxel size and membrane thickness to preserve the relative insensitivity to stretching. We then present characterization tests which confirm the model predictions. The dynamic response of the sensors is sufficient to detect the vibrations produced when a contacted object starts to slide.

Overview

Figure 1A:
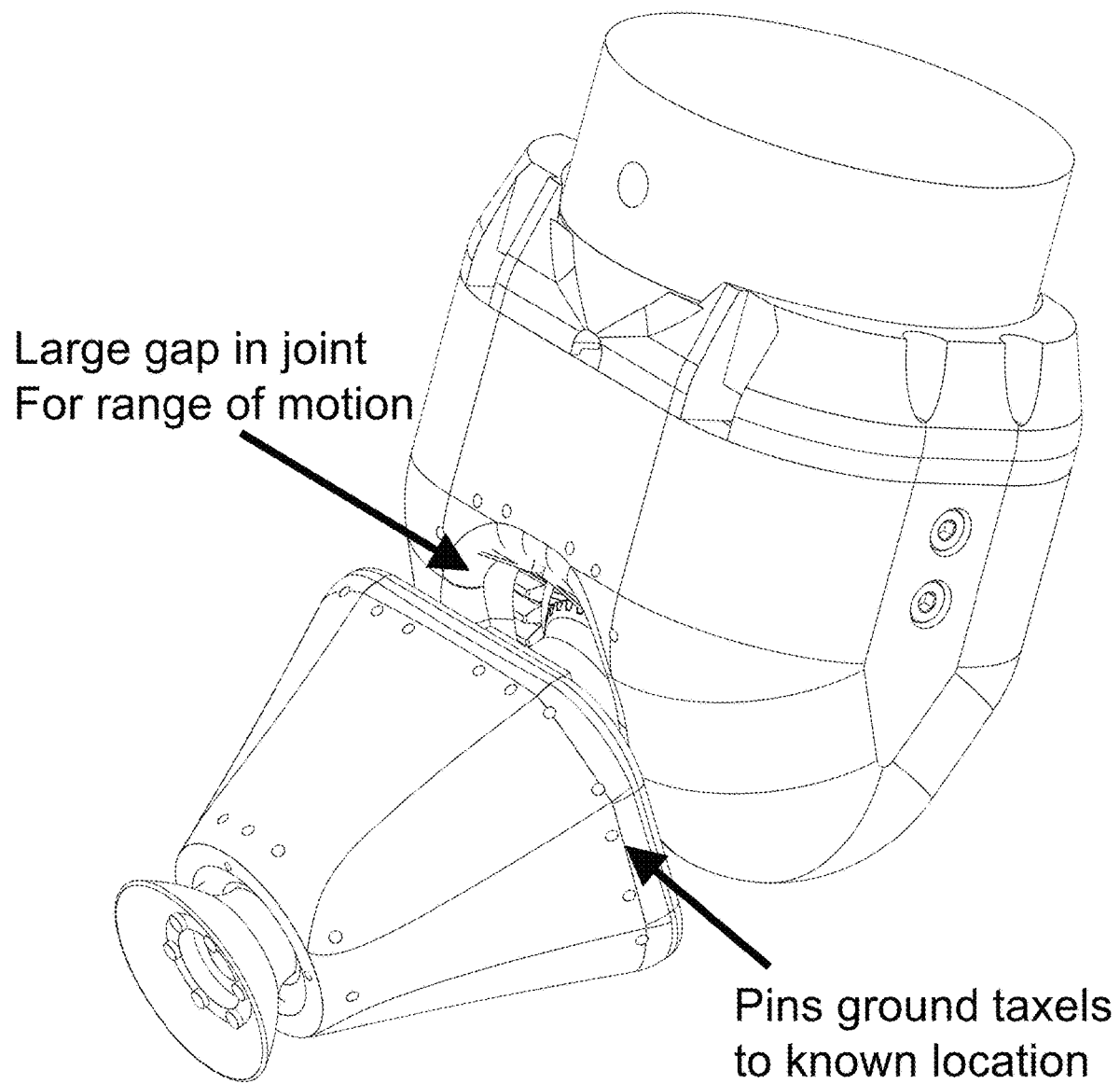
FIGS. 1A-B show according to an exemplary embodiment of the invention in FIG. 1A a robot wrist with 2-DOF, and in FIG. 1B an elastomeric tactile sensor sleeve or 'skin' capable of covering the robot wrist in FIG. 1A. For grey-scale to color interpretation, the reader is referred to the priority document.
Figure 1B:
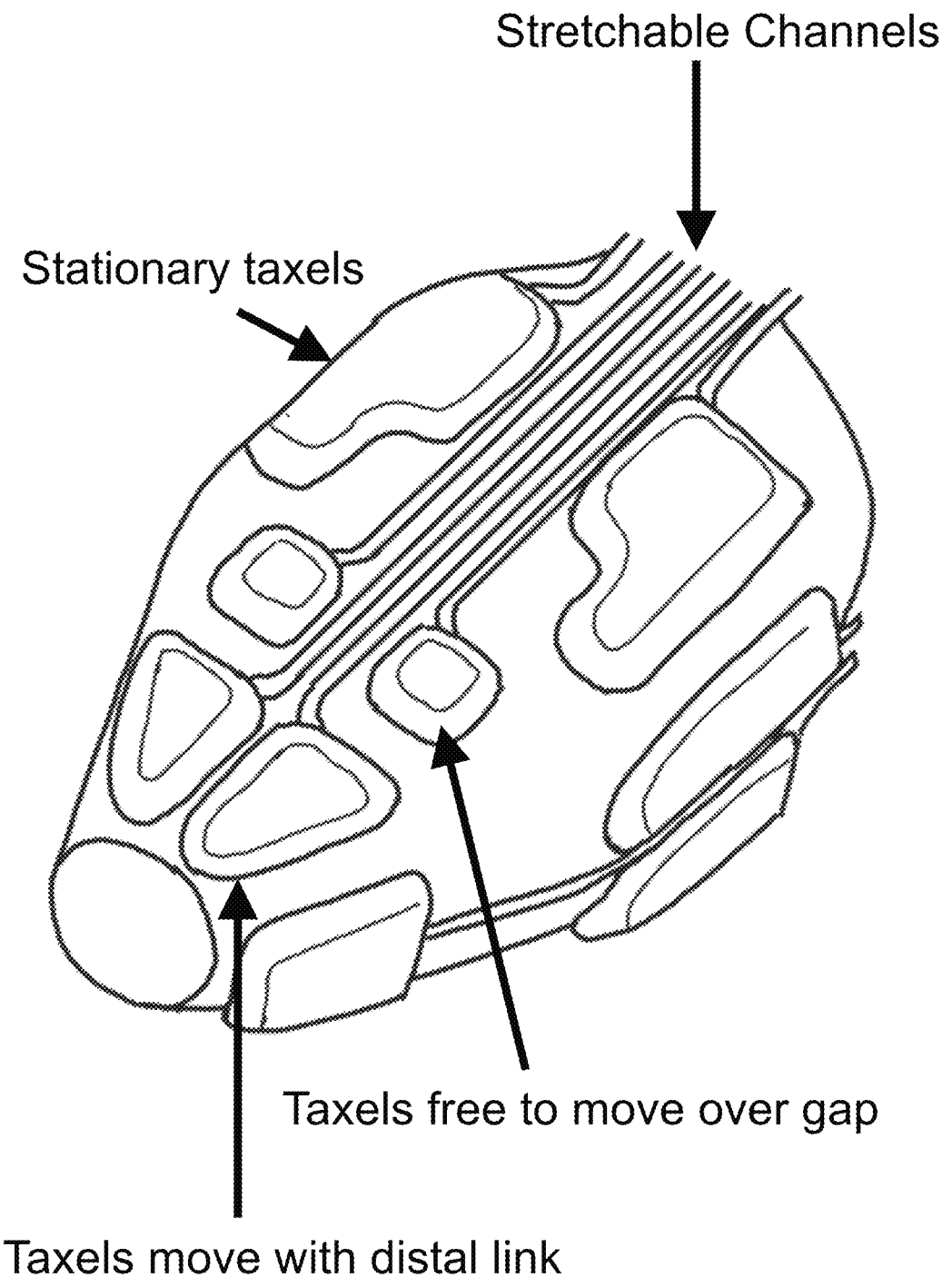

The sensors have thin elastomer membranes (taxels) connected to stretchable rubber channels that transmit pressure signals to off-board MEMS pressure sensors. The air-filled elastomer channels can be thought of as stretchable pneumatic alternatives to electrical wires. In molding together many sensor taxels and routed channels, we create a stretchable and soft sensor skin that plugs into an array of pressure sensing chips, which can be located tens or hundreds of centimeters away, depending on spatial and other constraints. The skin can be molded into a glove or sleeve shape, and pulled over a 2-DOF wrist (FIGS. 1A-B).

Figure 2:
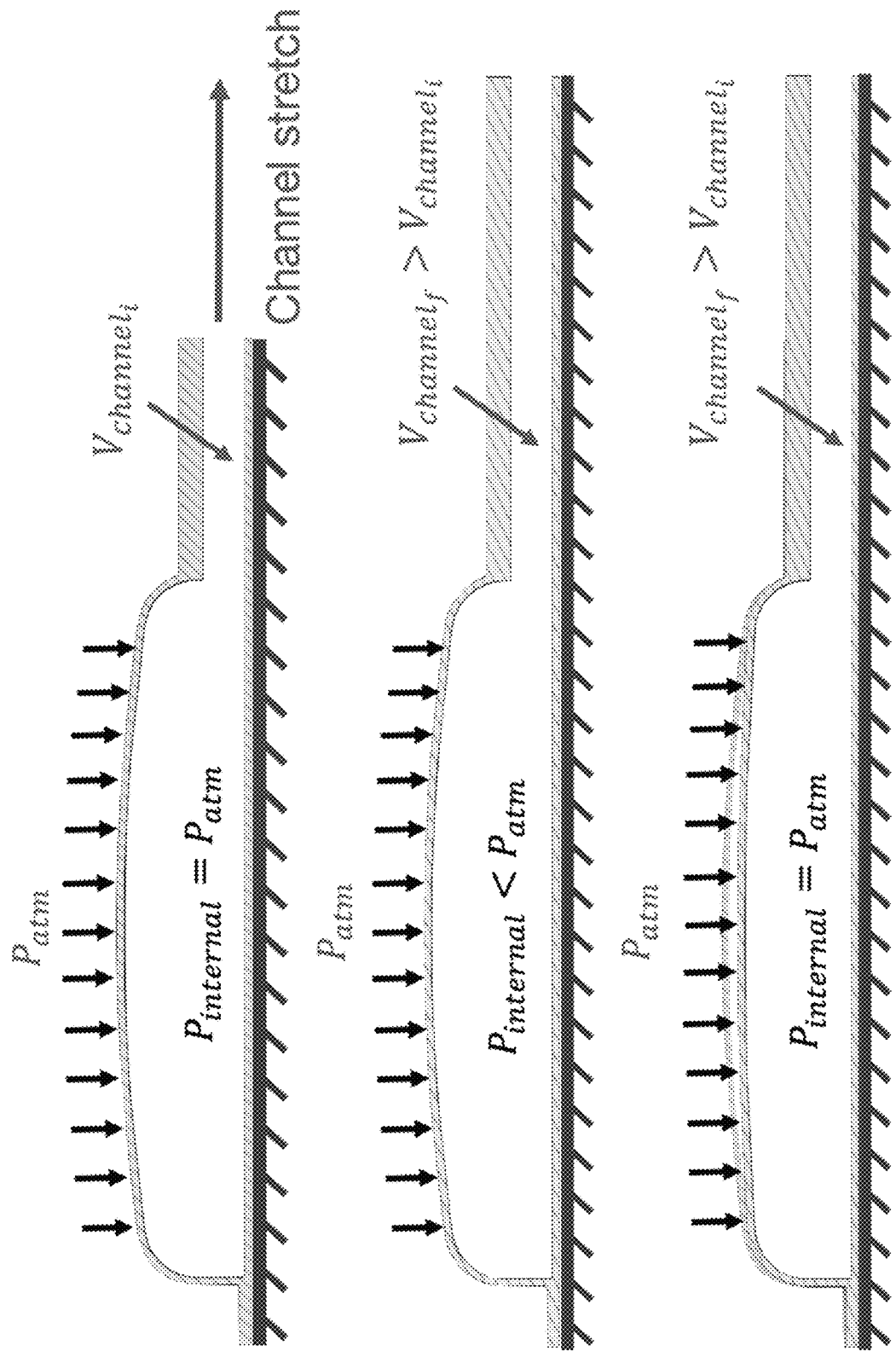
FIG. 2 shows according to an exemplary embodiment of the invention ambient pressure on a thin pouch/taxel membrane capable of counteracting the decrease in pressure as volume increases when the pneumatic channel is stretched. For grey-scale to color interpretation, the reader is referred to the priority document.

Many stretchable skins experience error as the element relaying signal from the sensor taxel to the digital processing components is stretched. Our design takes advantage of ambient air pressure to continuously equilibrate the internal pressure and significantly reduce this error. As the pneumatic channel is elongated, there is a volume increase in the system (FIG. 2), and corresponding pressure drop. This creates a pressure differential between the inside of the system and ambient air pressure outside. Since the taxel (and to a lesser degree, the channel) is formed of thin elastomer membranes, it deforms under the pressure differential, thereby decreasing the system volume, and equilibrating the internal pressure to the atmospheric pressure.

The ability of the system to equilibrate and eliminate error due to channel stretch is largely a function of the membrane stiffness. As a first approximation, we can model the membrane as a thin elastic plate, which suggests that the deflection will be proportional to the taxel diameter and membrane thickness:

$$w_{max} \propto P\left(\frac{d^4}{Et^3}\right) \quad (1)$$

where P is the distributed force applied to the plate, E is the Young's modulus, d is the membrane diameter, and t is the membrane thickness. The membrane stiffness follows:

$$K \propto \frac{P}{w_{max}} \propto E\left(\frac{t^3}{d^4}\right) \quad (2)$$

From eq. (2) we observe that the ability to equilibrate will diminish linearly with increasing material modulus and rapidly with increasing membrane thickness. For a given material, as we shrink the taxel dimension, d, the membrane thickness t must reduce accordingly. Moreover, as the taxels become smaller, the ratio of taxel volume to channel volume decreases, which makes it more difficult to compensate for channel stretching. These trends produce a tradeoff for taxel design, as decreasing the material stiffness and membrane thickness will also generally reduce the durability of the skin.

To quantity these tradeoffs, we conducted a numerical model as described in the following section.

Simulation

In practice, a material with a high tear strength and low stiffness should be selected to improve performance in the trade-off between robustness and membrane stiffness. As a result, the parametric study explored the effects of membrane thickness and membrane area on pressure equilibration and fixed the material properties to those of SmoothOn Dragon-skin 20, a commonly used soft and durable silicone rubber.

A simulation software was used to run a parametric sweep over geometrical variations while implementing an auxiliary sweep for each geometry to increment the solution and consider geometric nonlinearities.

A linear elastic material model of stiffness equal to Dragonskin 20's Young's modulus is used. This simplification is adequate because the maximum strain within the structures remains below 0.04. The material is assumed to be nearly incompressible.

For each geometry considered, a change in channel volume as determined through experiment was applied and the resulting pressure drop specific to each taxel geometry was calculated using the assumption of adiabatic expansion, with=1.4 as the adiabatic constant of air.

The external pressure was then gradually increased from the initial pressure to atmospheric pressure while an integration of the inner boundary determined the resulting volume change of the taxel. This volume was in turn used to determine the enclosed pressure, assuming adiabatic gas behavior. Due to the stresses within the final deformed solid, there is a final pressure difference between the enclosed and atmospheric pressures, and this difference causes a drop in signal. This is the sensor error due to channel stretch as predicted by the simulation.

Figure 3:
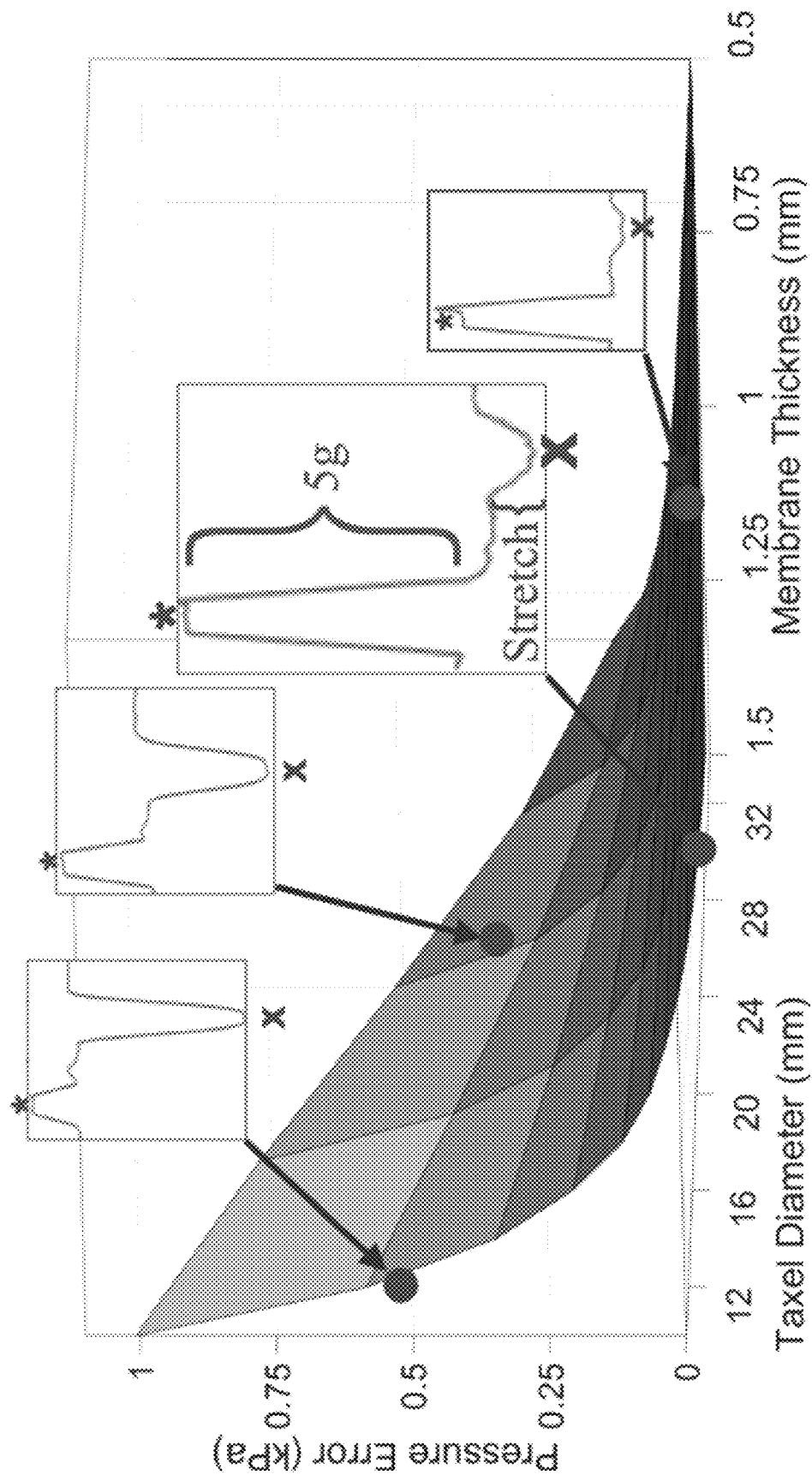
FIG. 3 shows according to an exemplary embodiment of the invention a simulated error surface in pressure due to channel stretch. Error increases with increasing membrane thickness and decreases rapidly with increasing membrane diameter. Experimental validation of four cases shown as dots in black, with one enlarged for clarity. Corresponding inset plots show pressure as a 5 g mass (49 mN) is applied and removed (asterisks), followed by the channel stretching by 100% length (crosses). The inset plots were measured over a 20 s interval. For grey-scale to color interpretation, the reader is referred to the priority document.

This predicted sensor error due to a 100% elongation of the channel for each geometry can be seen as the 3D surface in FIG. 3. The error is confirmed by inspection to increase approximately as $t^3/d^4$, as anticipated.

A sample set of data points were verified in experiments. These are shown as dots with accompanying inset plots of the pressure as a function of time for each case. In each subplot, a 5 g (49 mN) reference mass is applied and removed (peak) and then the attached channel is stretched 100% (dip). Each plot corresponds to approximately 20 s duration. As predicted, the taxels of smaller diameter and with thicker membranes exhibit significantly higher errors due to an increased stiffness that limits equilibration. This is confirmed in experiment by comparing the signal due to the reference load and the signal due to stretch. In comparison to the taxels of larger diameters and thinner membranes, the small, thick taxels exhibit greater sensitivity to stretch and therefore larger errors. The maximum discrepancy between the sensor error as predicted by simulation and the experimental error due to channel stretch is 0.074 kPa.

Using this guidance, we determined the membrane thickness and taxel area to provide the robustness needed while maintaining sensitivity to 0.01N for the sleeve for our 2-DoF wrist. For the scale of our sensors, an error of 0.01 N correlates to roughly 0.05 kPa. To meet this upper bound on error, we selected a membrane thickness of 1 mm and taxel area corresponding to at least 25 mm in diameter.

Skin Design

Two exemplary embodiments of the sensors were designed and characterized. The first is a single taxel (40×18 mm) with an attached 120 mm long channel with a 1.5×1.5 mm cross section. This sensor was used for characterization in the Results section infra, and can easily be placed on the links of a robot arm where desired, with the stretchable channel able to bridge across joints. The second embodiment was a sleeve as shown in FIGS. 1A-B, intended to cover a 2-DoF wrist with a suction cup at the end. The channels lead out the back of the wrist, experiencing stretch as it flexes and rotates.

The wrist has relatively large structural gaps to permit±60 in bending and 90 in roll. Fourteen of the taxels are grounded using a strain limiting fabric layer which can be anchored to the hand or wrist, ensuring defined positions and a firm substrate. Four taxels are "floating" as the sleeve bridges gaps at the joints. The need to provide sensing over gaps like these is a particular challenge for sensory skins.

For both the stand-alone taxel and the sleeve, the terminations of the channels can also be connected to longer lengths of stretchable rubber tubing (1.6 mm ID, McMaster 5234K93) to route the pressure signals from the taxels to remote pressure sensors if desired. Pressure signals are measured by an array of MEMS barometers (e.g. Honeywell ABPMANN060KGSA3) on a custom PCB, read by a Teensy 4.1 at 1 kHz through SPI communication. While these sensors have a 60 kPa range to allow for potentially high forces without damage, one advantage of pneumatic sensing in this manner is that alternative sensors can be simply plugged into the skin to match the application's desired specifications.

Fabrication

The bubble sensors are fabricated in flat areas using 3D printed 2-part molds. These arrays of molded sensors and channels can be directly applied to surfaces of robots (such as one direction of curvature), or molded onto pre-shaped carrier sleeve to conform to complex geometries (multiple degrees of curvature).

Figure 5B:
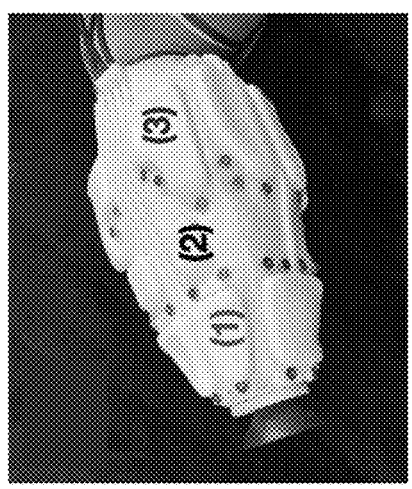
FIGS. 5A-C show according to an exemplary embodiment of the invention sensors tested during three wrist motions, each motion separated by a vertical line in the graphs. Between motions, the wrist returns to the neutral position.
Figure 5C:
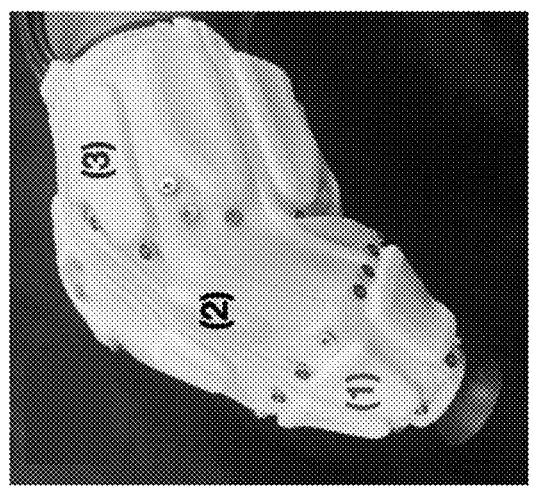
Figure 5A:
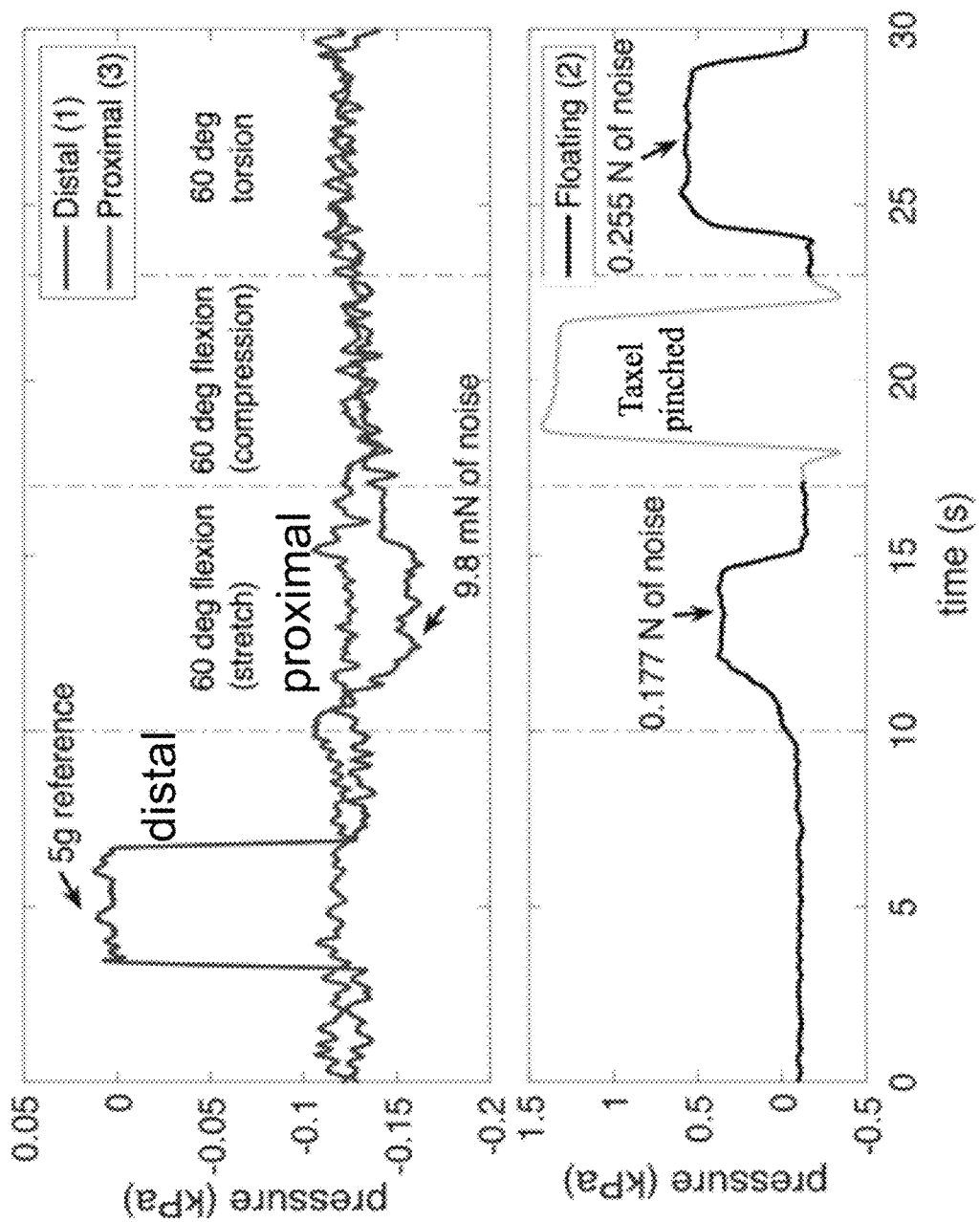

The carrier sleeve is made by brush coating a mold of the final desired form with DragonSkin 10NV (SmoothOn) while spinning it on a motor until cured, to ensure equal thickness (See FIG. 5A in Appendix A of Ser. No. 63/168,091 filed Mar. 30, 2021 to which this application claims priority). This elastomer was selected to make the skin robust to the internal strains from stretching, as well as damage from external impacts. Most elastomers have long stretch lifetimes; this silicone has a 1000% elongation at break, and over 17 N/mm Die B tear strength.

The sensor taxels and channels are formed in 2-part molds (See FIG. 5B in Appendix A of Ser. No. 63/168,091 filed Mar. 30, 2021 to which this application claims priority) to ensure precise geometry and membrane thickness. The molds were 3D printed on a Stratasys Objet 30 using VeroWhite with a glossy finish. Steel dowels assist with accurate alignment of the mold halves, and also form holes where the skin will later be secured to the wrist. The molds are treated with acrylic lacquer to prevent cure inhibition, and sprayed with EaseRelease 2000 before each casting. DragonSkin 10Fast is mixed with 10% by weight Silicone Thinner (along with desired pigmentation), poured into the molds, and degassed. The molds halves are brought together and left to cure under-weight, then de-molded.

A mold was lasercut from 0.3 mm thick mylar matching the skin areas. DragonSkin 10Fast is poured on and scraped across the lasercut gaps to create a thin silicone film. The molded taxels are laid open-cavity down onto the wet silicone film (See FIG. 5C in Appenix A of Ser. No. 63/168,091 filed Mar. 30, 2021 to which this application claims priority), and allowed to cure. Once cured, they are removed from the mold, and lasercut nylon patches are adhered to the bottoms using Silpoxy (See FIG. 5D in Appendix A of Ser. No. 63/168,091 filed Mar. 30, 2021to which this application claims priority). These patches can now be attached to a desired robot surface. To form a highly conformable sleeve, the patches are laminated onto the sleeve molded in step (See. FIG. 5A in Appendix A of Ser. No. 63/168,091 filed Mar. 30, 2021 to which this application claims priority) using Silpoxy (See FIG. 5E in Appendix A of Ser. No. 63/168,091 filed Mar. 30, 2021 to which this application claims priority), and desired fittings to interface to the sensors are plugged into the open channel ends and potted with Silpoxy for a seal (See FIG. 5F in Appendix A of Ser. No. 63/168,091 filed Mar. 30, 2021 to which this application claims priority). Finally, the holes for anchoring to the wrist are punched out of the silicone.

Results: Response to Stretch

Figure 4:
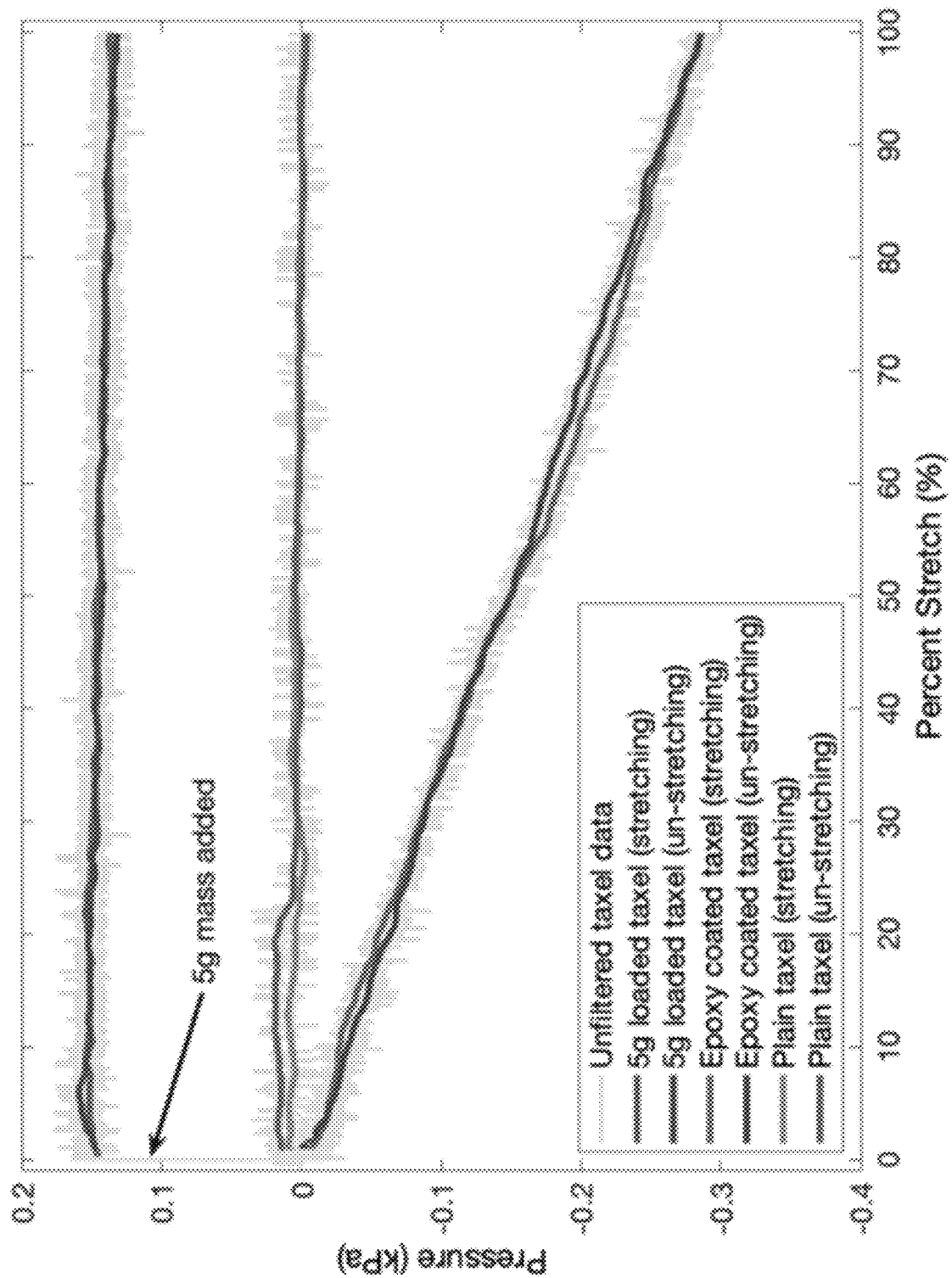
FIG. 4 shows according to an exemplary embodiment of the invention three tests conducted stretching the channel on a stage: first a 5 g (49 mN) mass is placed on a taxel, and the stage stretches it to 100% starting length. It is then returned to the initial length. Next, the same test is conducted without a 49 mN load on the taxel. Finally, a replica taxel that has been encapsulated in a 1 cm thick layer of hardened epoxy is tested, so that pressure equilibration is prevented, yielding higher error. For grey-scale to color interpretation, the reader is referred to the priority document.

The sensors' response to 100% strain on the channels was characterized on a linear stage. The benchtop sample described supra was clamped such that 80 mm of the 120 mm channel was floating; 20 mm of the channel on each end, as well as the taxel, were adhered to acrylic plates and mounted on the stage carriage and a grounded end. In each test, the stage stretched the channel to 160 mm and then returned it to its initial position, while the pressure sensor sampled at 1 kHz. FIG. 4 shows the load/unload loop for the taxel with a 5 g (49 mN) reference mass placed on its surface before stretch began. The error caused by the pressure change at 100% stretch is less than 9.8 mN. The test is repeated with the same taxel but no mass, to demonstrate that pressure equilibration is atmospheric, and not from the pressure the mass applies. Finally, we coat the sample with 1 cm depth of hardened epoxy to prevent equilibration from taking place on the taxel membrane, and 90.7 mN of error is realized as the channel is stretched. While the drop in pressure is much greater than the cases in which the taxel is allowed to equilibrate, some pressure equilibration on the thick channel walls still takes place.

To determine how well this equilibration works in a fully integrated system, a sensor sleeve was placed on the 2-DOF wrist described supra. Sensors were tested during various motions that the wrist can perform. FIG. 5A shows measured pressure taken at the same time on three sensors, as labeled in FIG. 5B-C. A 5 g (49 mN) reference mass is placed on the distal sensor and subsequently removed. Then the distal, floating, and proximal taxels' channels are stretched as the wrist undergoes 60 of flexion down (as shown FIG. 5A, then 60 of flexion up, then 60 of torsion. The greatest channel stretch occurs on the distal taxel, which observes approximately (9.8 mN) of noise. The floating taxels are able to move with the webbing of the sleeve, and are not anchored in place (though they are locally stabilized through reinforced fabric and do not stretch). These allow for more complete coverage, including in large areas over open joints, where most sensor skins would not provide sensing. However, these taxels are also subject to deformation as they become pressed against the underlying joint itself, and thus experience the most error (177 mN for flexion and 255 mN for torsion). The floating taxel during 60 compression is pinched slightly by the wrist itself, and should therefore be discounted (regardless, it is not exposed to the environment, and not a useful signal in this position). These signals can be calibrated for by accounting for the measured angle of the wrist using the motors' encoders.

Results: Frequency Response

One task of particular interest for using a skin in a cluttered environment is object manipulation with the back of the robot arm or wrist. Humans commonly slide objects out of the way with the backs of their hands, and are often able to tell based on force and vibration whether the object is sliding or has begun to tip. Similarly, our sensors can be used to detect sliding and tipping events based on signal frequency content as used by a robot arm to push an object.

Figure 6:
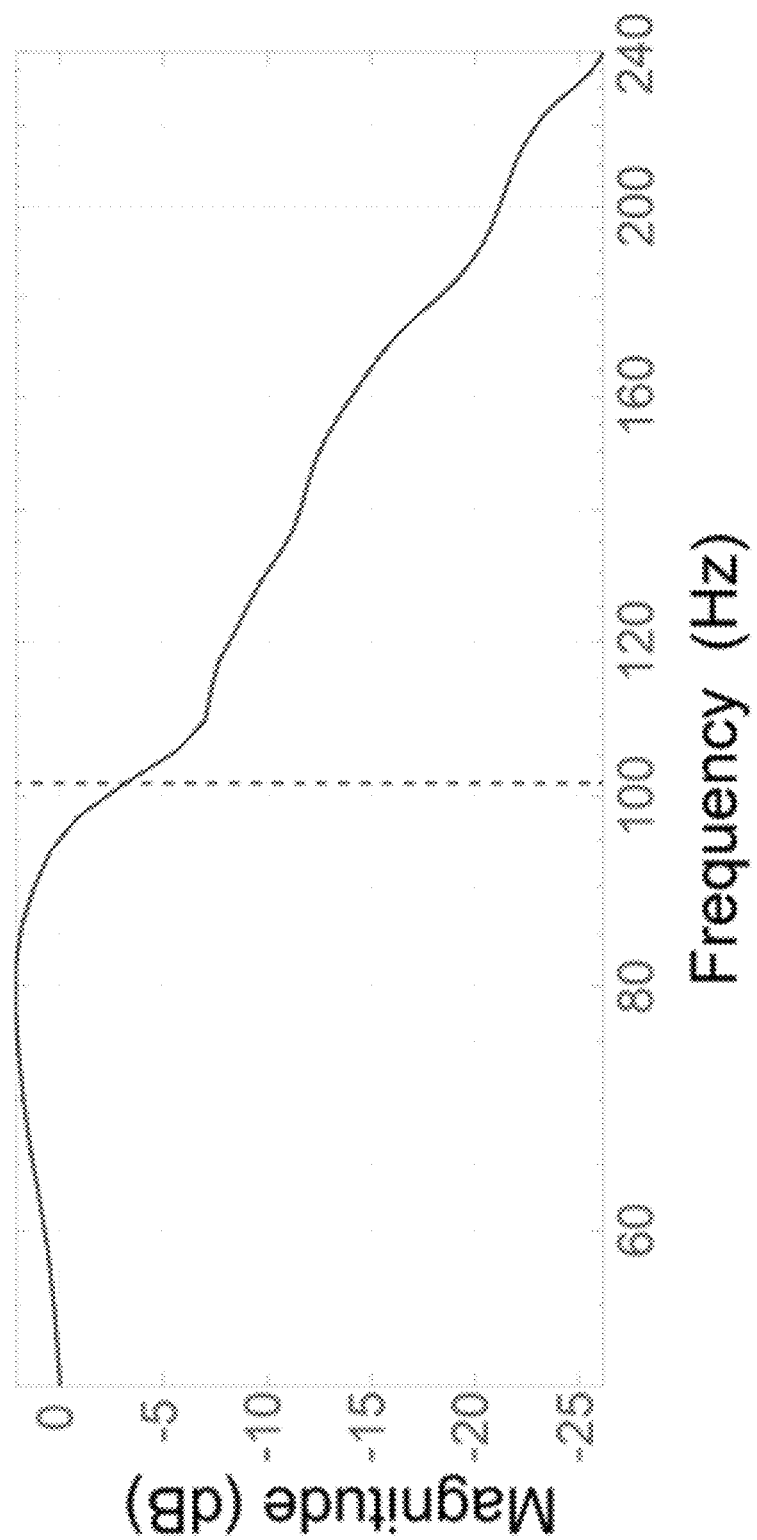
FIG. 6 shows according to an exemplary embodiment of the invention magnitude of sensor signal versus a load cell for a chirp from 50 to 250 Hz. Cutoff frequency (−3 dB) is at about 102 Hz. For grey-scale to color interpretation, the reader is referred to the priority document.

A subwoofer speaker cone was used to generate a frequency sweep from 50 Hz to 250 Hz while sampling the pressure sensor at 1 kHz. The sensor was placed in contact with a Futek 5 lb subminiature loadcell above the speaker cone, and below a 100 g mass to pre-load the taxel against the loadcell and speaker cone, and prevent separation during speaker vibrations. FIG. 6 shows the frequency response of the sensor with a roll-off frequency of 102 Hz.

Figure 7:
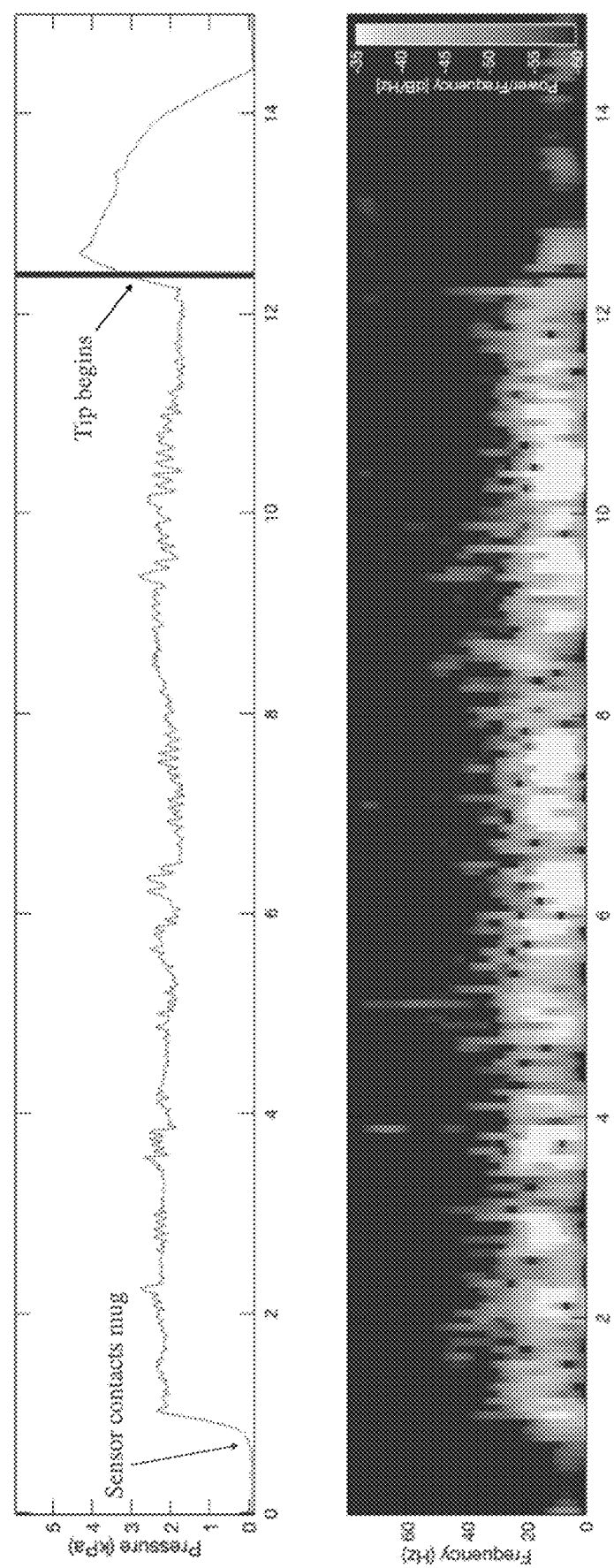
FIG. 7 shows according to an exemplary embodiment of the invention (top) raw pressure signal as stage brings sensor into contact with mug, pushes it, and then tips it against the trip switch. (below) spectrogram showing frequency change when tip occurs. The pressure sensor reads the characterization sample described in III through 30 cm of rubber tubing, to allow for sufficient motion of the stage. For grey-scale to color interpretation, the reader is referred to the priority document.

To determine if this bandwidth is sufficient to detect sliding vs tipping, the sensor is used to push an object across a plywood surface. A linear stage with a sensor taxel hanging off a paddle was used to push a mug (weight: 260 g) across a plywood surface at 1 cm/s. A limit switch protruding 1 mm from the plywood surface both induced tipping and recorded the moment at which it began. FIG. 7 (top) shows the experiment in time domain: first, the sensor is at 0 pressure until the stage pushes it into the mug. The mug is then pushed 11.5 cm while exhibiting vibration against the wood surface, until the mug begins to tip at the switch, causing a sudden increase in measured pressure. The spectrogram (bottom) is filtered and plotted with a 120 sample Hamming window, and the point at which tip occurs is labeled. There is a marked decrease in higher frequency vibration as well as low-frequency vibration as the mug pivots rather than slides.

Vibration itself is not a good indicator of tip: vibration can stop if the object transitions to a smoother surface. Force alone is also not a good indicator of tip: force can increase if the object is accelerated or runs into another object. However, the combination of a measured increase in force and decrease in high frequency vibration is a clear indicator of tip occurring. Note also that vibrations measured at the contact tend to be large compared to those from the robot drivetrain when an object is sliding. As demonstrated, our sensory skin has sufficient frequency response and sensitivity to force to facilitate a robot arm or wrist in tip detection.

Results: Scalability

For scalability across the lengths of robot arms and further, the sensors can be connected to multiple feet of small diameter rubber tubing. For our experiments we used the 40 A durometer latex tubing described supra in lengths less than 30 cm, as needed. There is some attenuation of the pressure signal that scales with the length of tubing, due to the elasticity of the tubes. A comparison measurement was performed between 25 mm (just long enough to reach the pressure sensor board) and 3 m long tubes to the pressure sensor (indicative of the length scale for a robot arm to DAQ station). A 5 g (49 mN) mass was placed on the taxel and the signal magnitude is attenuated only 10% and clearly measurable for this length scale.

In an attempt to determine maximum force before bursting, a 30 mm diameter, 1 mm thick taxel was tested up to 250 N with a plate and force gauge (350 kPa), and neither burst nor leakage were observed. Rather, the highly elastic DragonSkin balloons out from under the plate as pressure is increased.

The channels are relatively insensitive to applied force, compared to the taxels. A 5 g (49 mN) mass applied to the channels shows no measurable change in signal, and a 2 kg (19.6 N) applied mass shows a 29.4 mN change in signal.

System Demonstration, Examples, Other Embodiments

Examples of applications of the sensor skin as part of a robot system for performing force-controlled tasks in uncontrolled environments is described in Appendix A in U.S. Provisional Patent Application 63/168,091 filed Mar. 30, 2021, which is incorporated herein by reference. Other examples or embodiments described in Appendix B in U.S. Provisional Patent Application 63/168,091 filed Mar. 30, 2021, which is incorporated herein by reference.

What is claimed is:

1. A stretchable tactile sensor, comprising:
a plurality of elastomeric pouches,
wherein each of the plurality of elastomeric pouches is connected to a corresponding elastomeric channel,
wherein the elastomeric channel is connected to a corresponding off-board sensor,
wherein each of the plurality of elastomeric pouches when contacted transmits a pressure via the corresponding elastomeric channel to the corresponding off-board sensor, and
wherein each of the plurality of elastomeric pouches is sensitive to an applied pressure ranging from 0.01 kPa over an ambient pressure up to 5 MPa.

2. The stretchable tactile sensor as set forth in claim 1, wherein each of the plurality of elastomeric pouches has a thickness t, where $t \leq 10$ mm,
wherein each of the plurality of elastomeric pouches has an area A defined as $\pi t^2 \leq A \leq 1$ m$^2$,
wherein each of the plurality of elastomeric pouches has a Young's modulus E defined as 70 kPa $\leq E \leq 10$ MPa, and
wherein each of the plurality of elastomeric pouches has a pouch volume, $V_{pouch}$, defined with respect to a channel volume, $V_{channel}$, of their corresponding elastomeric channel defined as $V_{channel} \leq V_{pouch}$.

3. The stretchable tactile sensor as set forth in claim 1, wherein the off-board sensors are located at least a couple of centimeters from the plurality of elastomeric pouches.

4. The stretchable tactile sensor as set forth in claim 1, wherein the stretchable tactile sensor is designed to cover or encompass a space whereby the space allows motion that would stretch the stretchable tactile sensor.

5. The stretchable tactile sensor as set forth in claim 1, wherein the plurality of elastomeric pouches with their corresponding elastomeric channels and force sensing applications do not have any conductive or electronic components.

* * * * *